United States Patent
Sharma et al.

(10) Patent No.: US 7,669,000 B2
(45) Date of Patent: Feb. 23, 2010

(54) HOST BUS ADAPTER WITH MULTIPLE HOSTS

(75) Inventors: Prateek Sharma, San Jose, CA (US); Tony Sonthe Nguyen, San Jose, CA (US); Gregory S. Walter, San Francisco, CA (US); Surya P. Varanasi, Dublin, CA (US)

(73) Assignee: Brocade Communication Systems, Inc., San Jose, CA (US)

( * ) Notice: Subject to any disclaimer, the term of this patent is extended or adjusted under 35 U.S.C. 154(b) by 57 days.

(21) Appl. No.: 11/877,116

(22) Filed: Oct. 23, 2007

(65) Prior Publication Data

US 2009/0106470 A1      Apr. 23, 2009

(51) Int. Cl.
*G06F 13/36* (2006.01)

(52) U.S. Cl. .................. 710/310; 710/39; 709/250

(58) Field of Classification Search .............. 710/310, 710/305–306, 311–312, 316, 315, 38–39; 709/249–250
See application file for complete search history.

(56) References Cited

U.S. PATENT DOCUMENTS 6,330,630 B1 * 12/2001 Bell ........................... 710/312

7,493,416 B2 * 2/2009 Pettey ......................... 709/250

OTHER PUBLICATIONS

PCI Express Base Specification Revision 1.0, Apr. 29, 2002, pp. 1-2, 67,76 (www.pcisig.com).*

* cited by examiner

*Primary Examiner*—Clifford H Knoll
(74) *Attorney, Agent, or Firm*—Wong, Cabello, Lutsch, Rutherford & Brucculeri LLP

(57) ABSTRACT

A multi-host host bus adapter (HBA) can be connected to multiple host devices to allow the multiple host devices to communicate on a SAN fabric. More specifically, the multi-host HBA provides an interface for multiple SAN hosts without necessitating an HBA on each host, eliminating the need for an on-board HBA on each SAN host. The multi-host HBA interfaces to memory in each SAN host to which it is connected using PCI-Express (or a similar protocol), and communicates with other devices on the SAN fabric using Fibre Channel ports. The multi-host HBA communicates by receiving a command from a connected host, forwarding the command to a processor in the multi-host HBA, and sending the command to a device on a SAN. When the multi-host HBA receives a response from the device on the SAN, the multi-host HBA associates the response with the process and sends the response to the host.

34 Claims, 7 Drawing Sheets

HOST BUS ADAPTER WITH MULTIPLE HOSTS

BACKGROUND OF THE INVENTION

1. Field of the Invention

Embodiments according to the invention relates to blade servers. More particularly, embodiments according to the invention relate to connecting multiple blades to a single host bus adapter in a blade chassis.

2. Description of the Related Art

Effectively deploying multiple devices in a network environment becomes an increasingly complex task as transmission data rates, processor speeds, and storage capacities increase. Storage area networks (SANs) have been developed as specialized high-speed networks, referred to as fabrics, to connect computer systems, control software, and storage devices over the fabric. SANs typically allow block level input/output (I/O) rather than file-level access. Thus, every device connected to a SAN fabric appears as a locally attached device to other devices on the fabric.

Although a SAN allows for relatively simple interchangeability of components without disrupting other components, physical space available for components also presents a challenge. Blade servers have been developed in part to overcome traditional server-rack design restrictions. Blade server architecture allows multiple processor modules to be housed in a single chassis. Typically, the chassis provides the power supply for any attached blade servers, while each blade server has its own processor, memory, and possibly disk storage. Blade servers are designed for high-density computing applications, including SANs.

FIG. 1 shows components in a prior art blade chassis 101. The blade chassis 101 includes a Fibre Channel switch 102 and a series of host blades 104. Each host blade 104 has a processor 106, a bridge 108, memory 109, and a host bus adapter (HBA) 110. Conventionally, the HBA 110 is a daughter board connected to the host blade 104. Each memory 109, connected to the bridge 108, contains queues that comprise command and completion rings for data sent to and received from the HBA 110. The bridge 108 handles I/O processes and provides an interface between devices internal to and external to the host blade 104 (e.g., central processing unit (CPU) 106, HBA 110). As an example, the bridge 108 can provide PCI-X or PCI-Express connections to the HBA 110. Each HBA 110 connects the respective host blade 104 to other network and storage devices 114 on an enterprise fabric 112 via the Fibre Channel switch 102. As is known in the art, each HBA 110 has a unique World Wide Name (WWN), which identifies the HBA 110, and thus the respective host blade 104, to the Fibre Channel switch 102 and other devices on the enterprise fabric 112.

As seen in FIG. 1, modern server environments typically connect an HBA with each host blade. However, the actual data throughput on each of these HBAs is typically quite small compared to the capacity and link speeds that are possible in modern networks. In other words, a modern server typically cannot saturate its on-board HBA. Despite the advances in SAN and server technology, network designers are continuously seeking new ways to increase storage space, processing capabilities, and data transmission rates, while decreasing the overall physical network size.

SUMMARY OF THE INVENTION

A host bus adapter (HBA) according to one or more embodiments of the invention can be connected to multiple host devices. More specifically, a multi-host HBA according to one or more embodiments of the invention provides an interface for multiple SAN hosts to a SAN fabric using PCI Express to Fibre channel ports without necessitating an HBA on each host. The multi-host HBA interfaces directly to a bridge in each SAN host to which it is connected. The multi-host HBA operates by processing a received command from a connected SAN host, forwarding the command to a processor in the multi-host HBA, and sending the command to a device on the SAN fabric. When the multi-host HBA receives a response from the device on the SAN fabric, the multi-host HBA associates the response with the process command and sends the response to the host.

DETAILED DESCRIPTION

Reference will now be made in detail to several embodiments of the invention, examples of which are illustrated in the accompanying drawings. Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment. Wherever practicable, the same reference numbers will be used throughout the drawings to refer to the same or like parts.

One or more embodiments according to the invention are directed to an architecture of a multi-host HBA and a network including a multi-host HBA. The role of a multi-host HBA according to one or more embodiments of the invention is to provide an interface for multiple SAN hosts to communicate with devices on a SAN fabric. More specifically, the multi-host HBA accomplishes this by communicating with the SAN hosts using PCI-Express (or a similar protocol), and communicating with other devices on the SAN fabric using Fibre Channel ports. The multi-host HBA preferably eliminates the need for an on-board HBA on each SAN component. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Figure 1:
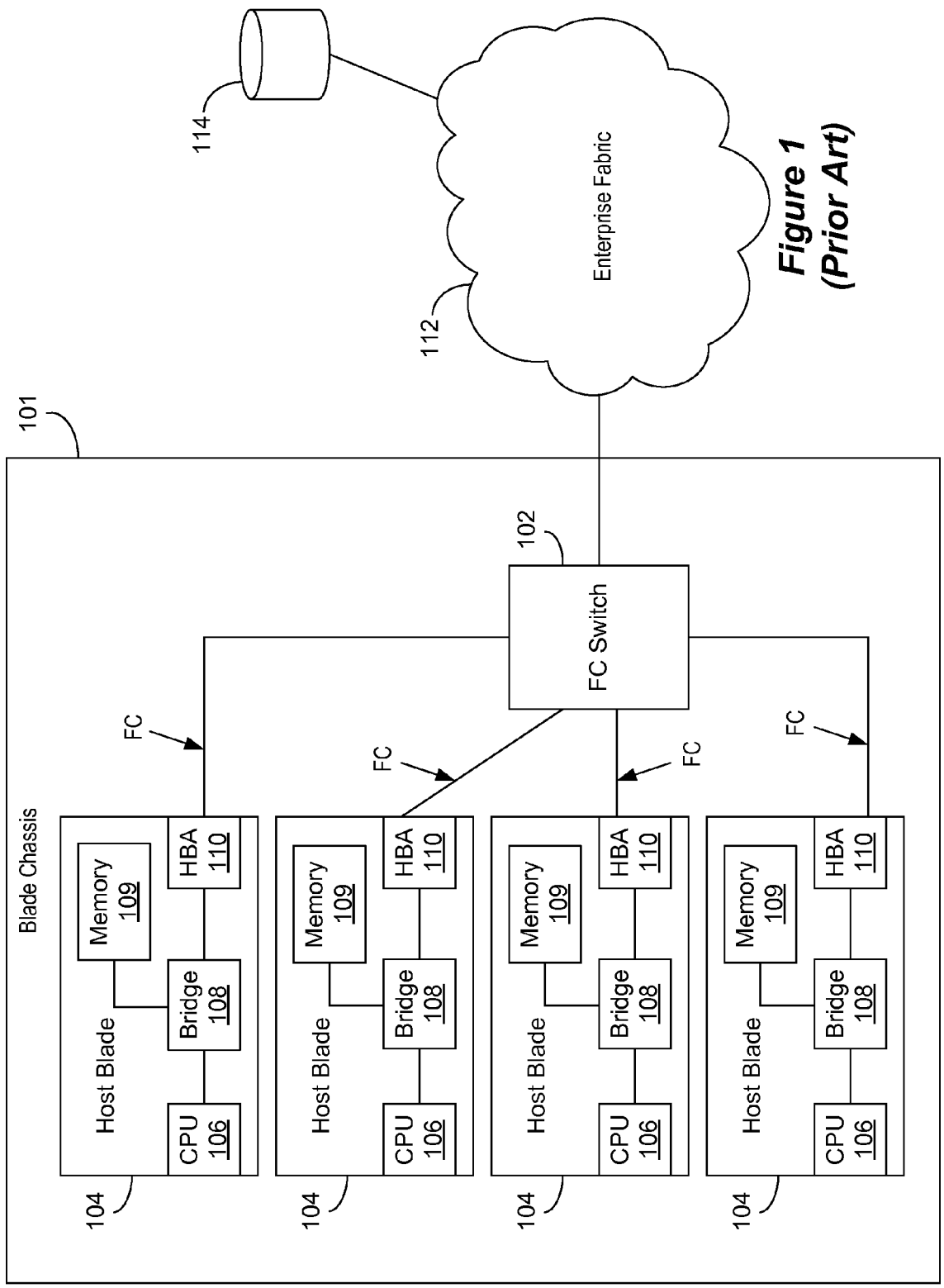
FIG. 1 is a schematic representation of a prior art network.
Figure 2A:
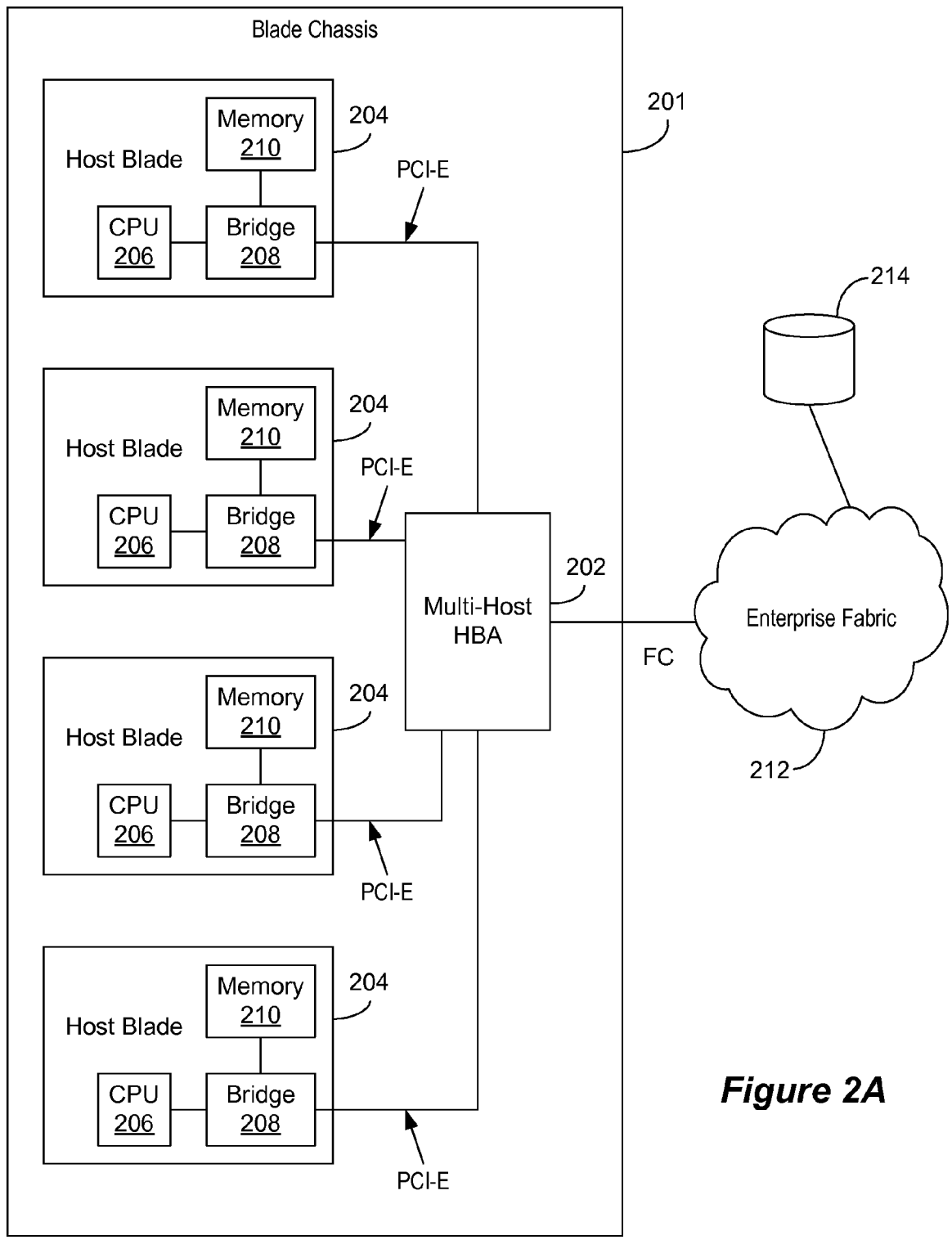
FIG. 2A is a schematic representation of a network having a multi-host HBA according to an embodiment of the invention.

FIG. 2A shows devices in a blade chassis 201 according to one embodiment of the invention. The blade chassis 201 includes a multi-host HBA 202 and a series of host blades 204. Each host blade 204 has a central processing unit (CPU) 206, a bridge 208, and memory 210. The CPU 206 handles processing functions of the host blade 204. The bridge 208 handles I/O processes and provides an interface between devices internal and external to the host blade 204 (e.g., CPU 206, memory 210). Each memory 210, connected to the bridge 208, contains queues that comprise command and completion rings (referred to generally as "message rings"). The multi-host HBA 202 is connected to the bridge 208 of each host blade 204, preferably using PCI-Express (PCI-E) links.

In brief, the multi-host HBA 202 provides an interface for the hosts 204 to a SAN fabric (e.g., enterprise fabric 212), which comprises one or more storage devices 214, which may be read from or written to. In the exemplary embodiment shown in FIG. 2A, the multi-host HBA 202 connects four host blades 204 to the enterprise fabric 212. With the multi-host HBA 202 connected to host blades 204, each of the host blades 204 may operate without having an on-board, dedicated HBA. This results in both cost and space savings on the host blade. As the multi-host HBA 202 effectively replaces the embedded Fibre Channel switch 102, that portion of the system can be considered basically cost and space neutral.

Figure 2B:
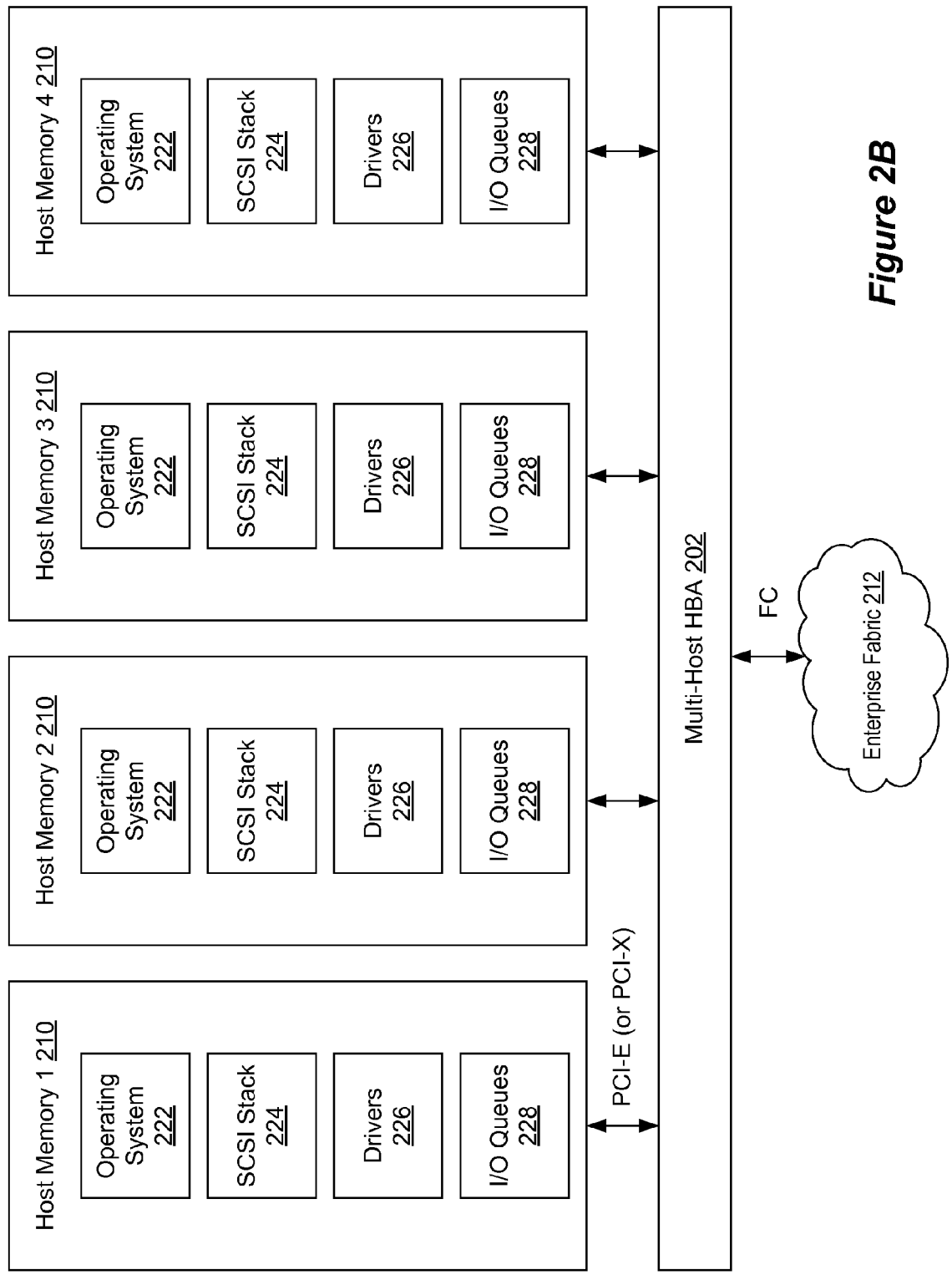
FIG. 2B is a schematic representation of host memory and a multi-host HBA according to an embodiment of the invention.

FIG. 2B shows a block diagram of host memory 210 connected to a multi-host HBA 202 according to one embodiment of the invention. Each host memory 210 shown in FIG. 2B communicates with the same multi-host HBA 202 via the aforementioned bridge 208. Each memory 210 includes registers allocated for the host 204 operating system 222, which are used to interface with the multi-host HBA 202 (i.e., to pass commands and data to and from the multi-host HBA 202), a SCSI stack 224, drivers 226, and I/O queues 228. In a preferred embodiment according to the invention, the I/O queues 228 comprise two command rings and two completion rings for data sent to and received from the multi-host HBA 202.

The SCSI stack 224 contains command descriptor blocks, which are transport independent. The SCSI command is converted to a Fibre Channel hierarchy and to a Fibre Channel Protocol (FCP) format by a driver 226. When a command is to be sent to the multi-host HBA 202, it is placed in a command ring in the I/O queue 228. Similarly, when a completion (i.e., a message indicating completion of a command by a network device) is received from the multi-host HBA 202, it is placed in a completion ring in the I/O queue 228. Completions in the completion rings are converted from FCP format to a SCSI command by the driver 226, which allows the SCSI stack 224 and the operating system 222 to interpret the completion and proceed accordingly. As shown in FIG. 2B, each host memory 210 interfaces, via the bridge 208 (shown in FIG. 2A) with the multi-host HBA 202 using a PCI-compliant protocol (in this case, PCI-Express or PCI-X), and the multi-host HBA 202 interfaces to a network via a Fibre Channel compliant protocol. While a PCI-compliant protocol and a Fibre Channel compliant protocol are shown in FIG. 2B for purposes of illustration, other protocols may be used that do not depart from the scope of the invention. For example, rather than a multi-host HBA, the multi-host device can be an Ethernet or Infiniband host channel adapter (HCA), and Ethernet network interface card (NIC), a SCSI controller, or any other host interface device which could be readily shared.

The multi-host HBA 202 uses a producer-consumer model for data transfer, which is described in the Conventional PCI 2.3 Specification, which is available from the PCI SIG at http://www.pcisig.com/ and which is hereby incorporated by reference in its entirety. This specification provides a model where a producer and a consumer located anywhere in a system can communicate with each other. In a preferred embodiment according to the invention, the host is the producer and the multi-host HBA 202 is the consumer. In brief, the multi-host HBA 202 utilizes this model by having the host (e.g., host blade 204) write to an internal register to point to a structure. This structure is then pulled by a DMA and forwarded to a processor on the multi-host HBA 202.

Figure 3:
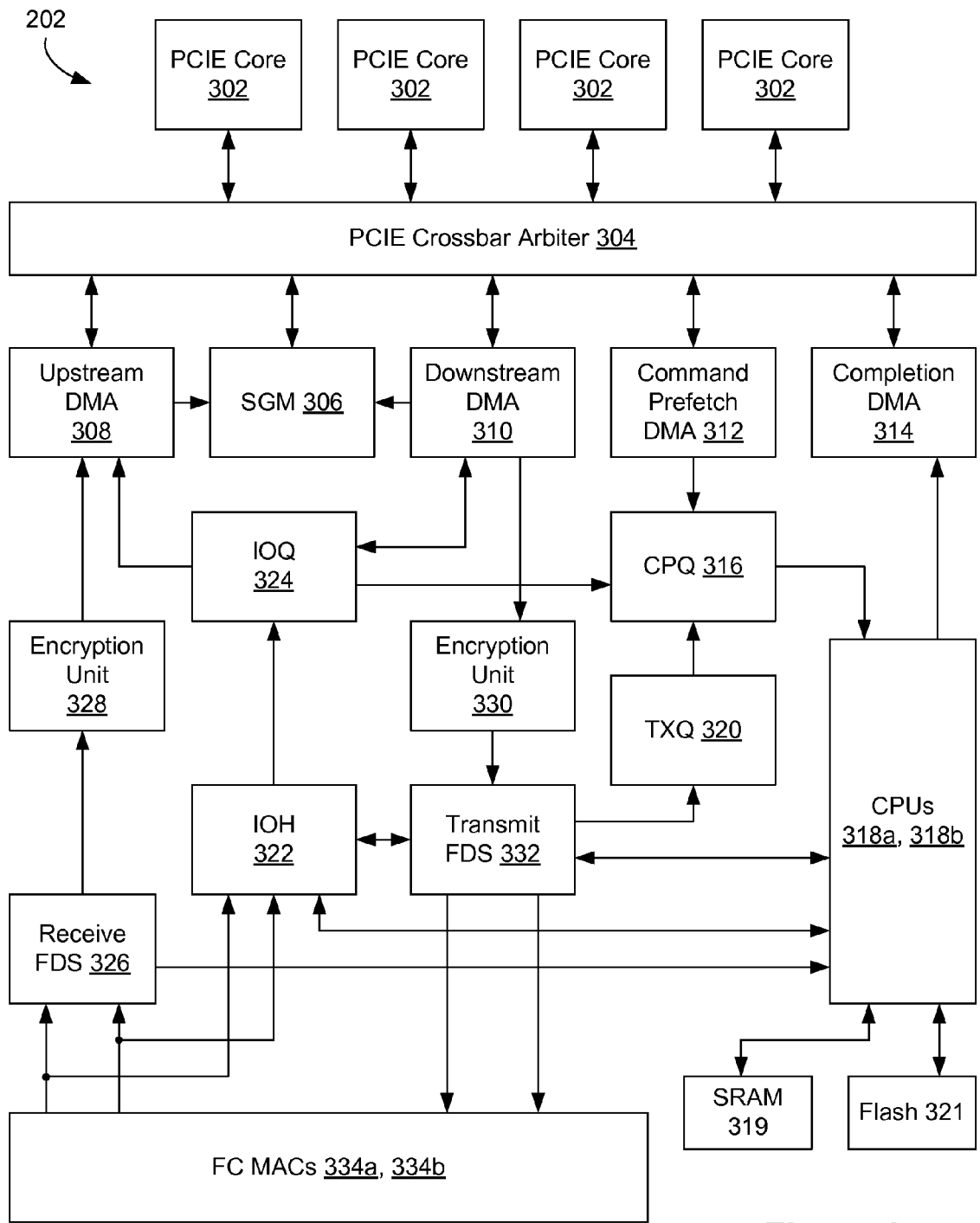
FIG. 3 is a block diagram of a multi-host HBA according to an embodiment of the invention.

FIG. 3 shows a multi-host HBA 202 according to one embodiment of the invention. The multi-host HBA 202 includes one or more PCI-Express (PCIE) cores 302, each of which interface to a host device (e.g., host blade 204 shown in FIG. 2A) and a PCIE crossbar arbiter 304. Each PCIE core 302 contains functionality to function as a port and interface the multi-host HBA 202 to a host device using a protocol understood by the host device, which in a preferred embodiment is the PCI-Express protocol. Thus, the PCIE core 302 can act as a PCIE master and initiate DMA transfers, and can also function as a PCIE target for host access. In general terms, the PCIE core 302 is a port that removes the complexity of PCIE routing from the rest of the multi-host HBA 202.

In one embodiment according to the invention, each PCIE core 302 includes a PHY interface, a transmission block, a reception block, and a control block. The PHY interface performs serializer/deserializer (SERDES) functions, to convert serial signals from a host to parallel signals that may be used in the HBA 202. The transmission and reception blocks perform PCIE data link layer and transmission layer functions. The control block maintains clock, control, and configuration information for the respective PCIE core 302. There are a total of eight SERDES devices (two in each PCIE core 302), via which one or more host blades 204 interfaces into the multi-host HBA 202. The PCIE cores 302 contain logic to allow the eight PCIE SERDES to operate in 1×8 mode (i.e., one PCIE link that is eight lanes wide) or in 4×2 mode (four independent PCIE links, each of which are two lanes wide). In other words, a connection between a host 204 and a multi-host HBA 202 may be a PCIE link comprising eight lanes, or a connection between each of four hosts 204 and a multi-host HBA 202 may be a PCIE link comprising two lanes. As will be discussed in detail below, such connections allow for particular allocation of queues in the multi-host HBA 202 to a host 204.

The PCIE crossbar arbiter 304 connects the PCIE cores 302 to the DMA controllers 308, 310, 312, 314, discussed in more detail below, and to a scatter-gather manager (SGM) 306. Briefly, the SGM 306 is connected to the upstream DMA engine 308 and the downstream DMA engine 310, and the completion DMA 314 is connected to the CPUs 318a, 318b. The DMA controllers 308, 310, 312, 314 allow for bus mastering in the multi-host HBA 202, i.e., to move data to and from the host memory. Specifically, the command prefetch DMA 312 pulls commands from command rings in host memory (e.g., command rings in I/O queue 228 shown in FIG. 2A), while the completion DMA 314 pushes completions back to completion rings in host memory. The upstream DMA engine 308 and the downstream DMA engine 310 are responsible for coordinating I/Os between the host devices and the multi-host HBA 202.

As mentioned above, an I/O command is fetched via the PCIE core 302 and the PCIE crossbar arbiter 304 by the command prefetch DMA 312, which forwards the command to the CPQ 316. The PCIE crossbar arbiter 304 arbitrates all devices connected to it, including, for example, the PCIE cores 302, the SGM 306, and the DMA controllers 308, 310, 312, 314. Accordingly, more than one host may send a request to the multi-host HBA 202 via the PCIE cores 302 at any given time, and the PCIE crossbar arbiter 304 schedules use of the HBA 202 by the hosts. Further, the PCIE crossbar arbiter 304 also allows the host blades 204 to access the multi-host HBA 202 for programming purposes.

On the FC side of the multi-host HBA 202, two Fibre Channel media access controllers (MACs) 334a, 334b provide an interface to a SAN fabric (e.g., enterprise fabric 212 shown in FIG. 2A). An upstream path between the FC MACs 334a, 334b and the PCIE crossbar arbiter 304 comprises receive buffers in a receive frame data storage unit (FDS) 326, a data integrity field (DIF)/encryption unit (DIP) 328, and the upstream DMA engine 308. A downstream path between the MACs 334a, 334b and the PCIE crossbar arbiter 304 comprises the downstream DMA engine 310, a DIP 330, and transmit buffers in a transmit frame data storage unit (FDS) 332. The receive FDS 326 and the transmit FDS 332 communicate with the CPUs 318a, 318b, and the transmit FDS 332 additionally communicates with the transmission queue (TXQ) 320. A crossbar I/O handler (IOH) 322 receives data from the FC MACs 334 and communicates with the transmit FDS 332, the CPUs 318a, 318b, and the IOQ 324. The IOQ 324 communicates with the IOH 322, the upstream DMA engine 308, the downstream DMA engine 310, and the CPU queue (CPQ) 316. The CPQ 316 receives data from the IOQ 324, the TXQ 320, and the command prefetch DMA 312, and transmits data to the CPUs 318a, 318b.

Operation of the components comprising a multi-host HBA 202 in communication with multiple host blades 204 may be explained with reference to FIGS. 2 and 3 by discussing I/O flow in the multi-host HBA 202, based on example commands. I/O flow in the multi-host HBA 202 comprises three phases: a command phase, an execution phase (comprising, e.g., execution of a read command or a write command), and a completion phase.

The command phase is initiated by the command prefetch DMA 312 in the multi-host HBA 202, in conjunction with the issuance of a command from a host CPU (e.g., CPU 206 shown in FIG. 2A) to a source device (in the case of a read) or a target device (in the case of a write) in a SAN fabric (e.g., enterprise fabric 212). Briefly, an I/O command is originated by a host CPU, and the command prefetch DMA 312 fetches the I/O command from the I/O command ring in the host's memory (e.g., in the I/O queue 228 shown in FIG. 2B) and schedules a request to a processor 318a, 318b for execution. In a preferred embodiment, the I/O command ring is configured for each command entry to be 64 or 128 bytes. However, one of ordinary skill in the art will understand that other entry sizes are possible. Preferably, each command entry has a bit allocated to decide which CPU 318a, 318b the command is scheduled to. Any remaining definitions for the request are defined in software.

The command prefetch DMA 312 comprises eight engines, each engine prefetching commands (which, as discussed above, are prepared by host CPUs 206) from I/O command rings in host memory 210. Referring to the above-mentioned producer-consumer model, the command prefetch DMA 312 is configured such that the host blade 204 is the producer and the multi-host HBA 202 is the consumer (i.e., the command prefetch DMA 312 emulates a FIFO in the host memory 210). The difference in producer-consumer pointers (referred to as the producer-consumer index) tells the command prefetch DMA 312 when the message rings in the host memory 210 are not empty. Based on the producer-consumer index, the command prefetch DMA 312 queues a new command to one of the two CPUs 318a, 318b for execution. In a preferred embodiment, the command prefetch DMA 312 operates on fixed data sizes and memory addresses. Specifically, the effective width of the FIFO may be configured to be a defined size in multiples of 64 or 128 bytes, to coincide with entries in the I/O command ring in the host memory 210.

In further detail, a command phase is initiated when a host provides a command pointer to the HBA 202. The command prefetch DMA 312 queues the new command from the originating I/O command ring in the host memory 210 by adding any necessary processor tags that define which CPU (318a or 318b) is to perform the command. As long as there is a transmit buffer in the transmit FDS 332 available for the channel associated with the entry in the I/O command ring, the command prefetch DMA 312 allocates a buffer, reads the entry, writes that data into the allocated buffer in the transmit FDS 332, and queues the allocated buffer into a dedicated queue in the CPQ 316 (discussed below) for the appropriate CPU 318a, 318b. The command is forwarded from the CPQ 316 to the appropriate set of message registers in one of the CPUs 318a, 318b. The CPU 318a, 318b processes the request by setting up a state table in the IOH 322 for the command and for related exchanges.

If the request is an accelerated I/O (i.e., a read command or a write command), the CPU 318a, 318b allocates an originator exchange identifier (OXID) and sets up the scatter-gather state in SGM 306, the I/O state table in the IOH 322, and the DIF/encrypt state in one of the DIPs 328, 330. Then, the CPU 318a, 318b creates the FCP command frame and queues the FCP command frame to the TXQ 320. Assuming that the I/O proceeds normally, the multi-host HBA 202 continues processing received I/O data frames without any CPU intervention. When processes related to the command phase are complete, the command prefetch DMA 312 moves on to check the next command entry in the host memory 210, thus continually queuing new entries.

The CPQ 316 functions as an event scheduler in the multi-host HBA 202. The CPQ 316 allows commands to be processed by a CPU 318a, 318b. Functionally, the CPQ 316 is a set of queues that point towards the CPUs 318a, 318b. The CPQ 316 provides two independent sets of queues with scheduling functions to the CPUs 318a, 318b, so that one CPU is not blocked by resource limitations on the other CPU. Based on the type of event and its priority, different queues are maintained for events for each CPU. The CPQ 316 follows a "push" model, which implies that events are queued to the CPU 318a, 318b by the CPQ 316, rather than the CPU pulling events to process from these queues. The CPQ 316 scans the event queues and based on a pre-determined priority, pulls out an event from a particular queue to submit it to the corresponding CPU 318a, 318b. This mechanism improves firmware efficiency by avoiding utilization of a "polling" scheme by the CPUs 318a, 318b.

Data sent to the CPQ 316 may be sent from the command prefetch DMA 312, the IOQ 324, or the TXQ 320. The queues in the CPQ 316 provide a mechanism for hardware adjacent to the CPUs 318a, 318b to inform the CPUs 318a, 318b of events on which the CPU software can act. One skilled in the art will appreciate that numerous queues exist or may be defined for events which need to be acted upon. In a preferred embodiment according to the invention, each independent set of queues in the CPQ 316 includes: a Host Command Queue for new commands that the command prefetch DMA 312 pulls from host memory; a FC Receive queue dedicated to incoming FC frames that the other hardware components in the HBA 202 will not act on or be able to resolve; a Transmission Queue buffer release queue for when a local processor 318a, 318b generates a frame and ships it to the Fibre Channel; a Transmission Queue timeout queue for when a frame times out in the transmission queue; an IOH Timeout queue for timeouts seen by the I/O handler 322; separate IOST Timeout queues for when read and write I/O processes time out; a single-deep Host Mailbox queue, for direct host-to-CPU communication; and a CPU Mailbox queue for messages passed between CPUs 318a and 318b. The CPQ 316 additionally includes an interrupt queue, for routing any interrupts to the CPUs. Interrupts are routed to one of the two CPUs, depending on the process the interrupt is directed to. In one embodiment according to the invention, the interrupt queue is a single-deep queue. The enqueue to the CPQ 316 is based on one of the above events. Dequeuing is based on a CPU 318a, 318b being able to accept another request.

The execution phase corresponding to a read command, e.g., from a host blade 204 for resources on a source network component in enterprise fabric 212, commences after completion of the command phase discussed above, where the command is a read command from the CPU of a host (e.g., CPU 206 of host blade 204). At a high level, the read command is sent from the CPU 318a, 318b to the source network component in the FC fabric via the transmit FDS 332 and the TXQ 320. Upon receiving the read command, the source network component sends a response in the form of Fibre Channel data (i.e., the data the host intends to read) to the multi-host HBA 202. A source that has received a read command from the multi-host HBA 202 sends read data frames to the multi-host HBA 202 via the Fibre Channel fabric (e.g., enterprise fabric 212 shown in FIG. 2A). The read data frames are received on an FC receive port via an FC MAC 334a, 334b.

The FC MACS 334a, 334b serve as interfaces between outside Fibre Channel links and logic internal to the multi-host HBA 202. Thus, the FC MACS 334a, 334b are responsible for converting downstream (outbound) data to an appropriate FC sequence, and for converting upstream (incoming) data from an FC sequence. The FC MACS 334a, 334b include a Fibre Channel protocol manager (FPM), which maps command data onto a Fibre Channel sequence, and maps received data from a Fibre Channel sequence. In addition to performing transmit and receive functions, the FC MACS 334a, 334b also perform SERDES functions and data conversion (e.g., 8/10 conversion). The two FC MACs 334a, 334b can be operated in loop mode or in point to point, and also support C-port mode. The two ports can operate as two independent links or as a single trunk port, and support auto-speed negotiation for two-, four-, or 8-Gigabit data transmission speeds.

From the FC MACs 334a and 334b, the data in a frame is sent to receive FDS 326 and portions of the data are provided to the IOH 322. In general terms, the IOH 322 performs necessary functions related to accelerated FCP processing, and the receive FDS 326 performs two functions: it stores incoming frames from FC wires, and it acts as a buffer for communication from CPUs 318a, 318b to the host. The multi-host HBA 202 has two independent FDS units 326 and 332 (i.e., one each for transmit and receive data paths), each comprising a plurality of buffers. The buffers in the receive FDS 326 are divided into four groups: two for the FC MACs 334a, 334b, and one group for each of the CPUs 318a, 318b. In an upstream flow, data is received via a buffer in the receive FDS 326. The receive FDS 326 stores the frames received on the FC ports that are uplinked to host memory 210.

As multiple data frames may be sent with some overlap, the IOH 322 captures all upstream and downstream frames and associates the transmissions with the correct process. In the context of a read command, the IOH 322 validates each incoming frame, associates the frame with the appropriate I/O, and queues the frame to the IOQ 324. In a preferred embodiment, the IOH 322 associates the data in properly validated frames to the correct I/O process and forwards this association to the IOQ 324. Validation, in the context of the IOH 322, includes checking all incoming frames for consistent, valid primitives, i.e., a start of frame (SOF) field, an end of frame (EOF) field, and a cyclic redundancy code (CRC). Any frame with an inconsistent SOF or EOF, an invalid EOF, or a failed CRC is preferably discarded with its buffer queued to the receive FDS 326 for deallocation.

Following validation, the frame is parsed by the IOH 322 to figure out whether the frame maps to any currently active I/O process. More specifically, the IOH 322 utilizes routing state tables to control the flow of the upstream data. The IOH 322 comprises an I/O state table, and the incoming data frame is looked up in the I/O state table (IOST). In a preferred embodiment, the IOST holds state information for up to 4,096 I/O processes. If the frame does not map to a currently active I/O process, then the frame is sent to one of the CPUs 318a, 318b for appropriate handling. If the frame does map to a currently active I/O process, then the IOH 322 determines the next operation to be done on that I/O process and routes the frame through a hardware accelerated path, using the IOQ 324 to execute the operation. Specifically, the IOH 322 provides commands to the IOQ 324, which routes the commands to the appropriate block in the multi-host HBA 202 (e.g., upstream DMA engine 308, downstream DMA engine 310, CPQ 316), and consequently, to the appropriate host (e.g., host blade 204).

In the context of a read command, the IOQ 324 schedules the frames to the upstream DMA engine 308. The I/O queue block (IOQ) 324 is a queue of all pending events for I/O processes that are currently active. The IOQ 324 comprises three queues: a downlink queue, an uplink queue, and an uplink message queue. For host initiated read commands, the queues in the IOQ 324 hold the read data frames and transfer the payload from these frames into the appropriate location in the host memory 210.

Concurrent to the IOQ 324 routing discussed above, the receive FDS 326 sends blocks of data to the DIP 328, which detaches data integrity fields, decrypts and authorizes data, and performs any necessary data format conversion. Thus, in a preferred embodiment according to the invention, DIF operation may be performed on the way to the host memory 210. Once decryption tasks are complete, the data is forwarded to the upstream DMA engine 308.

The upstream DMA engine 308 receives the data from the DIP 328, and works with the SGM 306 to continuously move data for all the frames related to the command to the host memory 210. In other words, DMA transfers for read operations in the HBA 202 are accomplished by the upstream DMA engine 308 with the aid of the SGM 306, which allows the transfer of data to multiple memory areas in a single DMA transaction. In coordination with the SGM 306, the upstream DMA engine 308 sends incoming data from the buffers in receive FDS 326 to the appropriate host (e.g., host blade 204 shown in FIG. 2A) via the PCIE crossbar arbiter 304 and the PCIE core 302.

More specifically, the upstream DMA engine 308 determines whether data corresponds to the read command based on information it receives from the IOQ 324. The upstream DMA engine 308 strips header and trailer information from received data that corresponds to the response to the read command, and uses the SGM 306 to send the data to the appropriate host. Once the upstream DMA engine 308 has completed its processing, the IOQ 324 releases the receive buffer in FDS 326, and schedules the next frames.

The upstream DMA engine 308 is capable of working under multiple I/Os at the same time in order to utilize the available bandwidth on the PCI link. The data portion of any FCP I/O process is mapped to a linked list of addresses in the host memory, which is referred to as scatter/gather list. For each FCP I/O process, the CPU 318a, 318b sets up the initial pointer to the scatter/gather list and then hands over control to the scatter/gather manager (SGM) 306. The SGM 306, under control of the IOQ 324, keeps getting the next set of addresses from the host on an as needed basis. These are the addresses where data is written to when working on an initiator read command.

The execution phase as it corresponds to a write command, e.g., from a host to a network component in enterprise fabric 212, commences after completion of the command phase discussed above, where the command is a write command from the CPU of a host. A write command is sent from the CPU 318a, 318b to the target device in the FC fabric through the transmit FDS 332 and the TXQ 320, as discussed above. When the target device is ready to accept the write, it sends a "transfer ready" message to the multi-host HBA 202. From the Fibre Channel fabric, the multi-host HBA 202 receives the transfer ready message from the target on a port in FC MAC 334a, 334b.

The IOH 322 validates the transfer ready message and then continually instructs the IOQ 324 to generate write data frames for the I/O until the transfer data is exhausted. After the IOH 322 receives the transfer ready message, it creates a header for the write data (from the host) and instructs the IOQ 324 regarding appropriate frame sizes to be sent from the host.

As mentioned above, DMA transfers for read and write operations in the HBA 202 are accomplished with the aid of the SGM 306. The downstream DMA controller 310 sends data from a host to a Fibre Channel device. More specifically, data is sent from the downstream DMA controller 310 to the DIP 330 in coordination with the SGM 306.

The data portion of any FCP I/O is mapped to a linked list of addresses in the host memory. This linked list is referred to as scatter/gather list. For each FCP I/O, the CPU 318a, 318b sets up the initial pointer to the scatter/gather list and then hands over control to the SGM 306. The SGM 306, under control of the IOQ 324, continually retrieves a next set of addresses from the host on an as-needed basis. These are the addresses where data is read from when working on an initiator write command or where data is written to when working on an initiator read command.

For host initiated writes, the IOQ 324 holds at most a single event per I/O to generate the next write data frame. The IOQ 324 merges the payload from the host blade 204 and the header from the IOH 322 to form a write data frame and then queues the frame to the TXQ 320. The IOQ 324 allocates a buffer from one of eight pools and instructs the downstream DMA engine 310 to generate the next data frame for the I/O. The IOQ 324 also informs the IOH 322 when the frame is queued to the TXQ 320.

The downstream DMA engine 310 pulls data from the host memory and pushes it onto the transmit FDS 332 under control of the IOQ 324. The downstream DMA engine 310 is capable of working under multiple I/Os at the same time to utilize the available bandwidth on the PCI link. More specifically, the downstream DMA engine 310 works with the SGM 306 and downloads the data into the allocated transmit buffer 332, and then queues the transmit buffer 332 to the TXQ 320. The data is retrieved using the SGM 306 and downstream DMA engine 310, is split into the appropriate frame size(s), and is merged with the header in the transmit FDS 332. DIF operation may be performed in the DIP 330 on the way to a buffer in the transmit FDS 332, as discussed above with respect to a read command. More specifically, the DIP 330 attaches data integrity fields, encrypts and authorizes data, and performs any necessary data format conversions.

As mentioned above, the multi-host HBA 202 has two independent FDS units 326 and 332 for transmit and receive data paths. The transmit FDS 332 stores frames that are down-linked from the host memory 210 and transmitted out on Fibre Channel (FC) ports. In a downstream flow, data is sent to a transmit FDS 332 after encryption. The transmit FDS 332 comprises a plurality of buffers to perform two functions: to carry frames that may eventually be transmitted on FC wires, and to act as a buffer for communication from the host to the CPUs 318a, 318b. In a preferred embodiment, the transmit FDS 332 comprises 240 buffers that are preferably divided into 18 groups, referred to as "virtual channels." These virtual channels map to the message rings in the host (e.g., host blade 204 shown in FIG. 2A). Each virtual channel has two groups of buffers in the transmit FDS 332. A first group of buffers is used to allocate buffers for the messages from the host, and the other group is used to allocate buffers for the data frames that the multi-host HBA 202 generates. Additionally, a group of buffers is reserved for each CPU.

The transmit FDS 332 performs segmentation and reassembly (SAR) duties before the data is sent to a FC media access controller (MAC) 334a, 334b, where the data is processed and sent on a FC network (e.g., enterprise fabric 212 shown in FIG. 2A). The transmit FDS 332 also sends completion messages to transmission queue (TXQ) 320, concurrent with or after sending the data to a FC MAC 334a, 334b.

After the multi-host HBA 202 has initialized (i.e., is write transfer ready), it generates data frames honoring FC-FS, FCP and target specific rules. No CPU intervention is necessary during this phase, assuming that the Sequence ID of the write is statically allocated to an I/O process. The data is then sent to the appropriate destination in the FC fabric via the transmission queue and the FC MAC 334a, 334b.

After completion of a command, a response frame (i.e., a completion) is sent by the target/source to the host through the multi-host HBA 202. The response frame is captured by the IOH 322 and the receive FDS 326. The IOH 322 associates the response frame with the correct I/O process, confirms the nature of the response, and sends the response frame via the IOQ 324 and the CPQ 316 to the appropriate register in one of the CPUs 318a, 318b. More specifically, the response frame is queued in the CPQ 316, and when the CPU 318a, 318b receives the response frame, the CPU 318a, 318b uses the appropriate buffer in the receive FDS 326 to build a completion, and sends the completion to the host that originated the command via the completion DMA 314, the PCIE crossbar arbiter 304, and the PCIE core 302. The completion DMA 314 moves the response frame from the receive FDS 326 to the host memory 210, and then releases the receive FDS 326.

The completion DMA 314 operates in a manner similar to the command prefetch DMA 312 discussed above. The completion DMA 314 creates a FIFO in the host memory 210 such that the multi-host HBA 202 is the producer and the host blade 204 is the consumer, and has eight different reply rings (also referred to as DMA virtual channels) mapped to the corresponding completion rings in the host 202. The completion DMA 314 strips any processor tags that were added to the completion data and pushes the completion back to a completion ring in the appropriate host memory. Each entry in a reply ring has a fixed size in multiples of 64 or 128 bytes.

The completion DMA 314 returns reply messages (prepared by the CPUs 318a, 318b) from the receive FDS 326 to host memory 210 to complete an initiator mode I/O command or to start a target mode I/O. The completion DMA 314 supports eight concurrent reply rings (DMA virtual channels). The reply ring is a circular queue structure with a statistically defined depth. The host blade 204 owns the consumer index while the completion DMA 314 owns the producer index. The producer index and consumer index are both registers in the completion DMA 314. The producer index is writable by the completion DMA 314 and read only by the host blade 204, while the consumer index is writable by host blade 204 and read only by the completion DMA 314. The completion DMA 314 maintains a shadow producer index register located in the host system memory 210. New reply message discovering on host blade 204 side is accomplished by the host blade 204 pulling the shadow producer index value based on interrupts (i.e., an interrupt coalescing mechanism is implemented). The completion DMA 314 ensures that the reply queue FIFO is not overrun by checking the producer index and the consumer index. The host blade 204 checks the producer index and the consumer index to determine how many new outstanding reply messages exist, and then processes them based on the exchange IDs. The completion DMA 314 maintains eight state machines (one on each virtual channel) to control the requests from the CPUs 318a, 318b. The completion DMA 314 re-asserts an 'available' signal as an indication to the IOQ 324 after the message is moved up to the host blade 204, so that the CPUs 318a, 318b and the IOQ 324 can release the appropriate frame buffer in the receive FDS 326. The completion DMA 314 implements DMA with fixed write burst lengths of 64 or 128 bytes, as discussed above.

The CPUs 318a, 318b perform various functions in the HBA 202 too complex to be performed by other hardware, such as translation of requests from a host blade 204, handling the command phase of a request, and completion of a request as it relates to a FC port and to a host blade 204. The CPUs 318a, 318b have identical configurations and interface logic, and further, the CPUs 318a, 318b are not hardwired to a specific FC port. Thus, while two CPUs 318a, 318b are discussed for the purposes of example, one skilled in the art will appreciate that the multi-host HBA 202 may comprise any number of CPUs, as well as different registers therein, without departing from the scope of the invention. Each CPU 318a, 318b comprises interface logic to connect to other modules in the multi-host HBA 202.

Figure 4A:
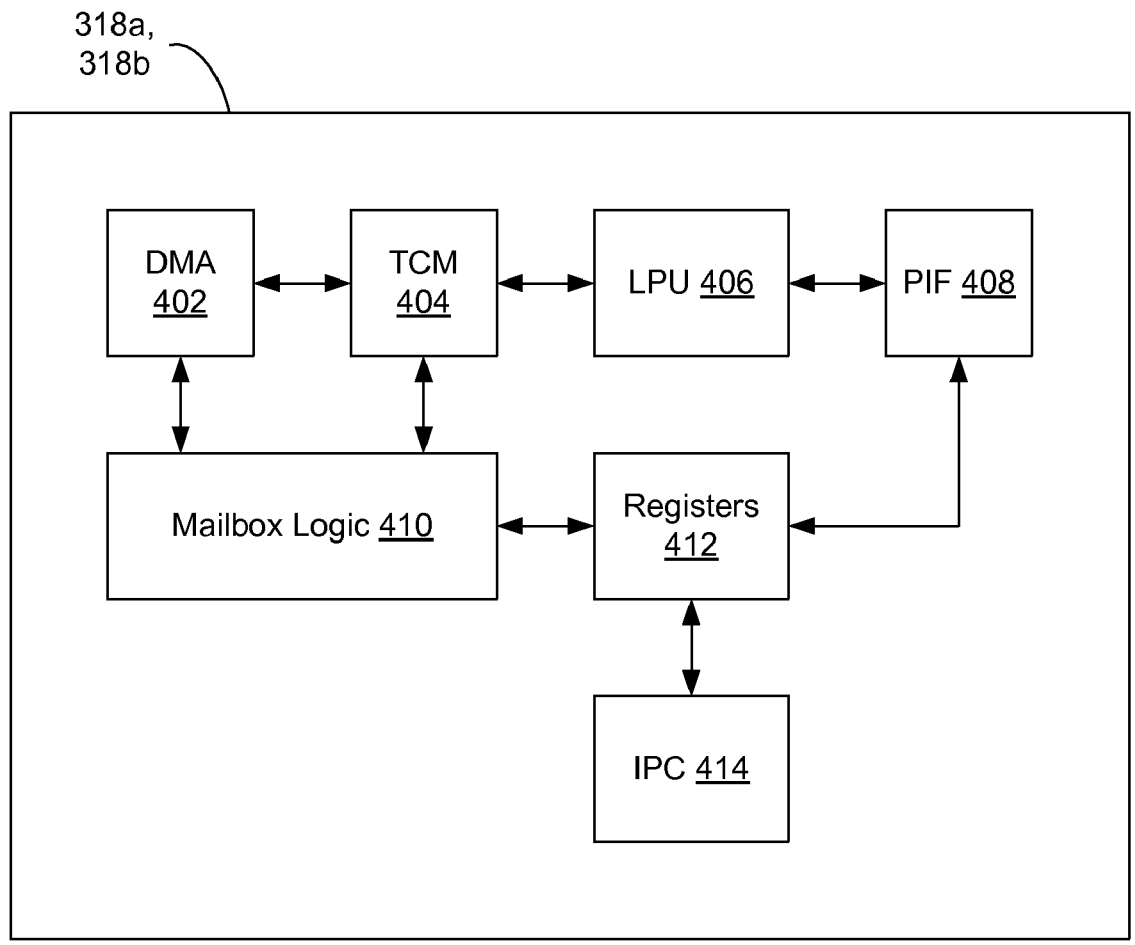
FIG. 4A is a schematic representation of a central processing unit (CPU) of a multi-host HBA according to an embodiment of the invention.

FIG. 4A shows a block diagram of elements internal to a CPU 318a, 318b. Briefly, the CPU 318a, 318b comprises a local processor unit (LPU) 406, which serves as the actual processor in each CPU 318a, 318b. Additionally, the CPU 318a, 318b comprises a DMA 402, a tightly-coupled memory (TCM) 404, a processor interface (PIF) 408, mailbox logic 410, one or more message registers 412, and an inter-processor communication block (IPC) 414. Each of the aforementioned components operate together to perform the required functions of the CPU 318a, 318b.

The TCM 404 comprises a plurality of mailboxes, which allow the CPUs to command hardware in the multi-host HBA 202. In a preferred embodiment, each CPU 318a, 318b comprises 32 mailboxes, with each mailbox being 16 bytes in size. Software in mailbox logic 410 writes a command to a mailbox specifying the function that a particular hardware component in the multi-host HBA 202 (e.g., TXQ 320) requires. When the software schedules an event to a CPU 318a, 318b on behalf of a hardware device in the multi-host HBA 202, a state related to the event may be preloaded in the TCM and the CPU 318a, 318b is notified. Similarly, when the CPU 318a, 318b wants to command hardware around it, the mailbox logic 410 sets up a mailbox in the TCM 404 and notifies the component about the command(s). When the component completes the command it provides a completion status to the CPU 318a, 318b. The CPU 318a, 318b has an on-chip memory for code and data and optionally has an external memory. In a preferred embodiment, the external memory is present and up to 4 MB in size. Additionally optionally coupled to the CPU 318a, 318b is a flash memory to hold persistent info.

Figure 4B:
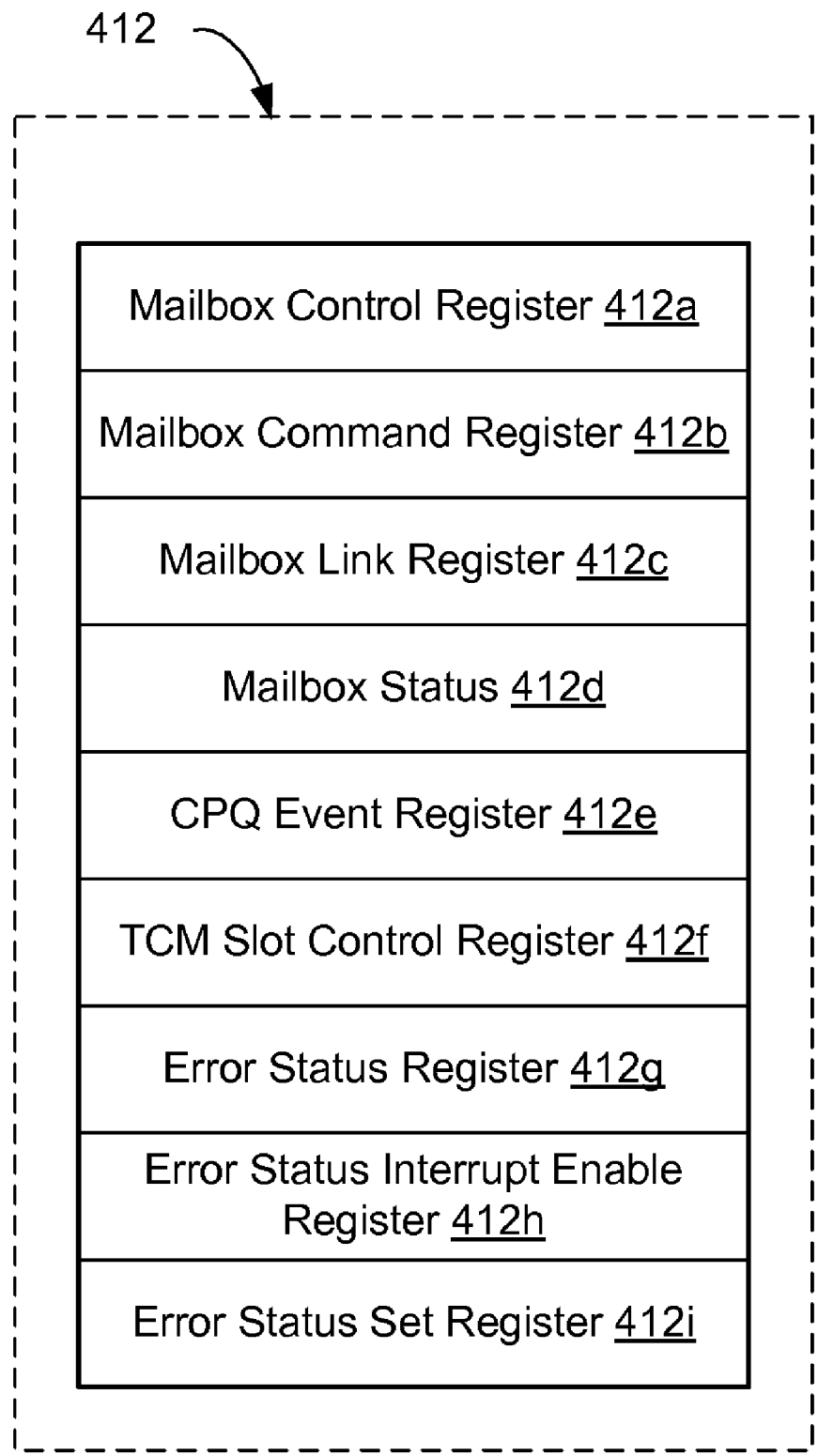
FIG. 4B is a schematic representation register space of a CPU of a multi-host HBA according to an embodiment of the invention.

FIG. 4B shows portions of a message register 412 in the register space of a CPU 318a, 318b of a multi-host HBA 202. Typically, the registers 412a-412l in the register space are accessed as a result of commands from the host blades 204, such as read and write commands. Among the various registers, the mailbox control register 412a controls the mailbox logic, and the mailbox command register 412b is used to trigger the execution of a command in a mailbox memory. The mailbox link register 412c is used to sequence the execution of a set of mailboxes. The mailbox status register 412d reports the status of the mailbox memory. The CPQ event register 412e (from CPQ 316) presents events to the CPU 318a, 318b. It comprises the basic information required for each CPU 318a, 318b to process the event that it presents. The tightly coupled memory (TCM) slot control register 412f is used to control data in a TCM slot, which is a section of TCM that is used to pass data related to CPQ 316 requests presented to the CPU 318a, 318b. Two TCM slot control registers are supported per CPU 318a, 318b. Whenever the CPU 318a, 318b does not need to access any data in the TCM slot, it sets a 'done' bit in the TCM slot control register such that other hardware has access to it. When a device sees that a done bit is set, it clears the done bit and loads the slot with data for a CPQ 316 request. This request is passed to the CPU 318a, 318b via the CPQ request register with a bit indicating which slot has the associated data. The CPU 318a, 318b processes this data, and when done, sets the done bit so that hardware devices can repeat the sequence to present another CPQ request. The error status register 412g indicates that an error is detected in the CPU 318a, 318b. The error status interrupt enable register 412h is used to enable an interrupt when an error is detected, as indicated by the error status register. The error status set register 412l is used to set an error status in the CPU 318a, 318b.

Four sets of message registers 412 are allocated within the two CPUs 318a, 318b, with each message register 412 assigned to a specific host (e.g., host blade 204). In a preferred embodiment of the invention, each CPU 318a, 318b comprises two sets of message registers 412. Thus, each CPU handles processes specifically related to two of four possible hosts. Each partitioned message register contains information particular to the host associated with the partition, such as FIFO length and the number of devices to which the host communicates. The offset individual control registers are located in PCI-E register space. Thus, while a given multi-host HBA 202 is capable of interfacing with multiple hosts, each host sees a single HBA that it "owns" and can communicate with. While two CPUs 318a, 318b and four total sets of message registers are discussed in relationship to the CPUs, a different number of processors and registers, as well as different CPU-register combinations, may be implemented with similar functionality without departing from the scope of the invention.

Use of the multi-host HBA in conjunction with the host blade(s) 204 may require re-initialization if error conditions occur. If an error condition occurs, the multi-host HBA 202 raises an interrupt in each PCIE core 302. This interrupt is received by the host and allows the host drivers to check for an error condition. If an error condition is found among the multiple host devices, it is assumed a problem exists at the level of the multi-host HBA, and a hard reset or other debugging may be performed.

While embodiments according to the invention discussed above incorporate four separate PCIE cores 302 with each core 302 connected to a single host, a larger or smaller number of cores or hosts may be configured to operate in the multi-host HBA 202 without departing from the scope of the invention. For example, the four cores 302 shown in FIG. 3 may also be configured to allow access from a single host device at a greater data rate. Further, while PCI-Express is the preferred bridge-to-HBA interconnect, other interconnects, such as HyperTransport or proprietary processor links could be used. Further, while two Fibre Channel MACs 318a, 318b are shown in FIG. 3, one skilled in the art will appreciate that a larger or smaller number of FC MACs may be configured to operate in the multi-host HBA 202.

Figure 5:
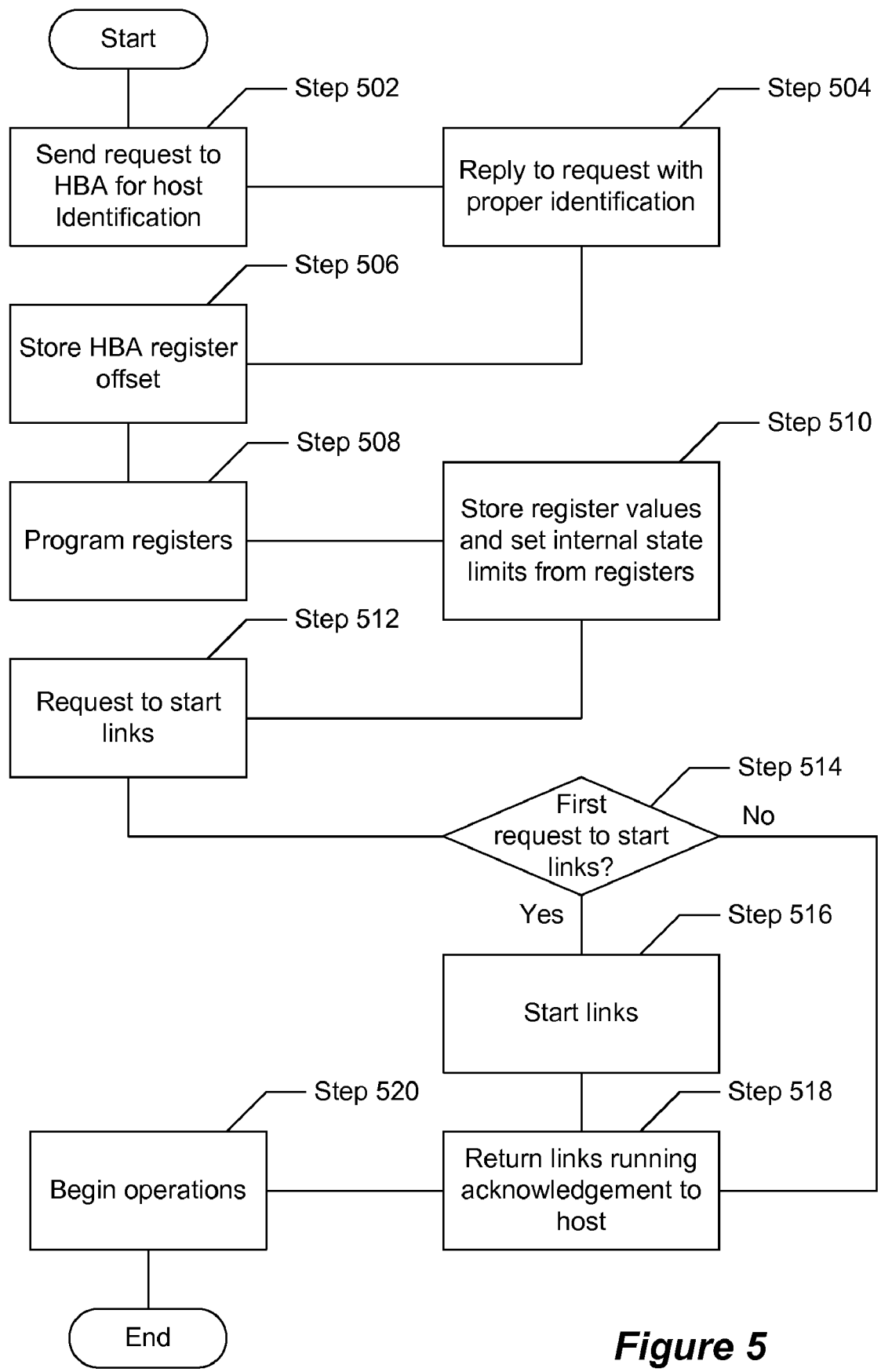
FIG. 5 is a flow chart showing a process by which a host device driver and a multi-host HBA are initialized according to an embodiment of the invention.

FIG. 5 shows a process by which a host device and a multi-host HBA are configured for processing a command according to one embodiment of the invention. The command may relate to any command or shared component between the two devices, such as a request to initialize Fibre Channel links. As seen with respect to FIG. 5, a host device (e.g., a host blade 204 as seen in FIG. 2A) sends a request to a multi-host HBA for identification of the host (Step 502). Upon receiving the request, the HBA replies with the proper identification of the host (Step 504). Using the identification value sent to the host by the HBA, the host stores a register offset value corresponding to an offset in the HBA memory which the host will access when data is sent between the host and the HBA (Step 506), and programs its registers (Step 508). The multi-host HBA stores the register values and sets internal state limits based on the register values (Step 510).

At step 512, the host sends the HBA a request. The request may be any command performed by the host, including, for example, to start the Fibre Channel links, initializing a Virtual SAN subinterface, configuring a port channel, etc. In the example process shown in FIG. 5, the request is to start Fibre Channel links. Then, at step 514, a determination is made as to whether this is the first request to start the Fibre Channel links since the HBA has been started. If this request is the first request to start Fibre Channel links, the HBA processes the command (Step 516) and returns an acknowledgement of successful completion of the command to the host (Step 518). If the request is not the first request, the HBA simply returns an acknowledgement (Step 518). For example, if FC links are already running and the host requests to start the FC links, the HBA simply returns an acknowledgement that the links are running to the host. By not actually starting the link again, no in-progress operations are corrupted. To the host, it appears that the links have been started when the acknowledgement is sent, regardless of whether the links were already running. At this point, the host begins (or returns to) other normal operations such as accessing devices on a SAN through the HBA (Step 520). One skilled in the art will appreciate that although a particular process is shown in FIG. 5, these or similar steps and their order may vary dependent upon the request issued by the host.

Advantages of the invention include one or more of the following. In some embodiments of the invention, a host may offload components and related processes via the multi-host HBA. For example, networking components, and video components, as well as processes related to these components, may be offloaded to hardware on the multi-host HBA or elsewhere on the network. In some embodiments of the invention, a host server may be installed without an on-board HBA. This saves space on the server board itself, and additionally saves the cost associated with adding a HBA to a server board.

Moreover, one or more embodiments according to the invention operate on or work in conjunction with an information system. Such an information system as claimed may be an entire networked system as detailed below in the described embodiments or only portions of such a system. For example, embodiments according to the invention can operate with an information system that need only be a communications network in the simplest sense to detect and route information. Thus, embodiments according to the invention are capable of operating with any information system from those with minimal functionality, to those providing all of the functionality disclosed herein.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A multi-host device, through which data is transferred between a host device and a network device, configured to convert the data between a host device protocol and a network device protocol, comprising:

a plurality of host device ports, each for interfacing to one host device;

at least one external interface port for interfacing to the network device;

at least one memory controller configured to receive the data from the host device and send an acknowledgement to the host device via at least one of the plurality of host device ports;

a plurality of queues configured to schedule a command interpreted from the data received from the host device;

at least one processor configured to execute the commands in the plurality of queues, comprising:

a plurality of registers, including a register corresponding to each host device;

command logic configured to pass commands to and from the registers; and execution logic configured to execute the commands in the registers;

a transmit buffer configured to temporarily store the data before it is transferred to the network device via the at least one external interface port; and a receive buffer configured to temporarily store the acknowledgement before it is transferred to the host device, wherein to each host device connected to the multi-host device, the multi-host device appears connected to no other host device, and wherein to the multi-host device, each host device connected to the multi-host device appears distinct from other host devices connected to the multi-host device.

2. The multi-host device of claim 1, wherein the network device interprets the commands from the plurality of host devices to be sent from a single device.

3. The multi-host device of claim 1, further comprising an input/output handler (IOH) configured to capture upstream and downstream frames and associate the upstream and downstream frames with the command, wherein the IOH comprises an input/output state table.

4. The multi-host device of claim 1, wherein the host device communicates with the multi-host device using a PCI-compliant protocol.

5. A network, comprising:
a host device comprising a memory;
a storage unit; and
a fabric, comprising:
- a multi-host device through which data is transferred between the host device and the storage unit, configured to transform the data between a host device protocol and a network device protocol, comprising:
  - a plurality of host device ports, each for interfacing to one host device;
  - at least one external interface port for interfacing to the network device;
  - at least one memory controller configured to receive the data from the host device, wherein the data comprises a command;
  - a plurality of queues configured to schedule the command for execution;
  - at least one processor configured to execute the command, comprising:
    - a plurality of registers, including a register corresponding to each host device;
    - command logic configured to pass the command to and from the registers; and
    - execution logic configured to execute the command in the registers;
  - a transmit buffer for temporarily storing the data before it is transferred to the storage unit; and
  - a receive buffer for temporarily storing an acknowledgement before it is transferred to the host device,
  - wherein to the host device, the multi-host device appears connected to no other host device; and
  - wherein to the multi-host device, the host device appears distinct from other devices connected to the multi-host device.

6. The network of claim 5, wherein the multi-host device comprises a core configured to interface to the host device.

7. The network of claim 5, wherein the multi-host device comprises an input/output handler (IOH) configured to capture upstream and downstream frames and associate the upstream and downstream frames with the command.

8. The network of claim 5, wherein the memory in the host device comprises:
a command queue and a completion queue, wherein the command queue and the completion queue are accessed by the multi-host device.

9. The network of claim 5, wherein the host device comprises a plurality of command registers configured to interface with the multi-host device.

10. The network of claim 5, wherein the host device communicates with the multi-host device with a PCI-compliant protocol.

11. A blade computer system, comprising:
a blade chassis for receiving at least a plurality of host blades and an interface unit;
first and second host blades installed in said blade chassis; and
an interface unit installed in said blade chassis, said interface unit including a multi-host device through which data is transferred from one of the first host blade and the second host blade to a network device, configured to transform the data between a host blade protocol and a network device protocol, comprising:
- a plurality of host blade ports, each for interfacing to one host blade;
- at least one external interface port for interfacing to the network device;
- at least one memory controller configured to receive the data from the host blade, wherein the data comprises a command;
- a plurality of queues configured to schedule the command for execution;
- at least one processor configured to execute the command, comprising:
  - a plurality of registers, including a register corresponding to each host device;
  - command logic configured to pass the command to and from the registers; and
  - execution logic configured to execute the command in the registers;
- a transmit buffer for temporarily storing the data before it is transferred to the network device; and
- a receive buffer for temporarily storing an acknowledgement before it is transferred to the host device,
- wherein to the first host blade, the multi-host device appears connected to no other device; and
- wherein to the multi-host device, the first host blade appears distinct from the second host blade.

12. The blade computer system of claim 11, wherein the multi-host device further comprises an input/output handler (IOH) configured to capture upstream and downstream frames and associate the upstream and downstream frames with the command, wherein the IOH comprises an input/output state table.

13. The blade computer system of claim 11, wherein the host blade communicates with the multi-host device using a PCI-compliant protocol.

14. The blade computer system of claim 11, wherein the network device interprets the commands from the first and second host blades to be sent from a single device.

15. The blade computer system of claim 11, wherein the multi-host device comprises a core configured to interface to the host blade.

16. The blade computer system of claim 11, wherein the memory in each of the first and second host blades comprises:
a command queue and a completion queue, wherein the command queue and the completion queue are accessed by the multi-host device.

17. The blade computer system of claim 11, wherein the first and second host blades each comprise a plurality of command registers configured to interface with the multi-host device.

18. A multi-host device, through which data is transferred between a host device and a network device, configured to convert the data between a host device protocol and a network device protocol, comprising:
a plurality of host device ports, each for interfacing to one host device;
at least one external interface port for interfacing to the network device;
at least one memory controller configured to receive the data from the host device and send an acknowledgement to the host device via at least one of the plurality of host device ports;
a plurality of queues configured to schedule a command interpreted from the data received from the host device;
at least one processor configured to execute the commands in the plurality of queues, comprising:
a plurality of registers;
command logic configured to pass commands to and from the registers; and
execution logic configured to execute the commands in the registers;

a transmit buffer configured to temporarily store the data before it is transferred to the network device via the at least one external interface port; and a receive buffer configured to temporarily store the acknowledgement before it is transferred to the host device, wherein to each host device connected to the multi-host device, the multi-host device appears connected to no other host device, wherein to the multi-host device, each host device connected to the multi-host device appears distinct from other host devices connected to the multi-host device, and wherein when the multi-host device receives a repeated command from a host device, the multi-host device returns an acknowledgement of completion of the repeated command to the host device without performing the repeated command.

19. The multi-host device of claim 18, wherein the network device interprets the commands from the plurality of host devices to be sent from a single device.

20. The multi-host device of claim 18, further comprising an input/output handler (IOH) configured to capture upstream and downstream frames and associate the upstream and downstream frames with the command, wherein the IOH comprises an input/output state table.

21. The multi-host device of claim 18, wherein the host device communicates with the multi-host device using a PCI-compliant protocol.

22. A network, comprising:
a host device comprising a memory;
a storage unit; and
a fabric, comprising:
a multi-host device through which data is transferred between the host device and the storage unit, configured to transform the data between a host device protocol and a network device protocol, comprising:
a plurality of host device ports, each for interfacing to one host device;
at least one external interface port for interfacing to the network device;
at least one memory controller configured to receive the data from the host device, wherein the data comprises a command;
a plurality of queues configured to schedule the command for execution;
at least one processor configured to execute the command, comprising:
a plurality of registers;
command logic configured to pass the command to and from the registers; and
execution logic configured to execute the command in the registers;
a transmit buffer for temporarily storing the data before it is transferred to the storage unit; and
a receive buffer for temporarily storing an acknowledgement before it is transferred to the host device,
wherein to the host device, the multi-host device appears connected to no other host device,
wherein to the multi-host device, the host device appears distinct from other devices connected to the multi-host device, and
wherein when the processor receives a repeated command from a host, the processor returns an acknowledgement of completion of the repeated command to the host without performing the repeated command.

23. The network of claim 22, wherein the multi-host device comprises a core configured to interface to the host device.

24. The network of claim 22, wherein the multi-host device comprises an input/output handler (IOH) configured to capture upstream and downstream frames and associate the upstream and downstream frames with the command.

25. The network of claim 22, wherein the memory in the host device comprises:
a command queue and a completion queue, wherein the command queue and the completion queue are accessed by the multi-host device.

26. The network of claim 22, wherein the host device communicates with the multi-host device with a PCI-compliant protocol.

27. The network of claim 22, wherein the host device comprises a plurality of command registers configured to interface with the multi-host device.

28. A blade computer system, comprising:
a blade chassis for receiving at least a plurality of host blades and an interface unit;
first and second host blades installed in said blade chassis; and
an interface unit installed in said blade chassis, said interface unit including a multi-host device through which data is transferred from one of the first host blade and the second host blade to a network device, configured to transform the data between a host blade protocol and a network device protocol, comprising:
a plurality of host blade ports, each for interfacing to one host blade;
at least one external interface port for interfacing to the network device;
at least one memory controller configured to receive the data from the host blade, wherein the data comprises a command;
a plurality of queues configured to schedule the command for execution;
at least one processor configured to execute the command, comprising:
a plurality of registers;
command logic configured to pass the command to and from the registers; and
execution logic configured to execute the command in the registers;
a transmit buffer for temporarily storing the data before it is transferred to the network device; and
a receive buffer for temporarily storing an acknowledgement before it is transferred to the host device,
wherein to the first host blade, the multi-host device appears connected to no other device,
wherein to the multi-host device, the first host blade appears distinct from the second host blade, and
wherein when the multi-host device receives a repeated command from a host blade, the multi-host device returns an acknowledgement of completion of the repeated command to the host blade without performing the repeated command.

29. The blade computer system of claim 28, wherein the multi-host device further comprises an input/output handler (IOH) configured to capture upstream and downstream frames and associate the upstream and downstream frames with the command, wherein the IOH comprises an input/output state table.

30. The blade computer system of claim 28, wherein the host blade communicates with the multi-host device using a PCI-compliant protocol.

31. The blade computer system of claim 28, wherein the network device interprets the commands from the first and second host blades to be sent from a single device.

32. The blade computer system of claim 28, wherein the multi-host device comprises a core configured to interface to the host blade.

33. The blade computer system of claim 28, wherein the memory in each of the first and second host blades comprises:

a command queue and a completion queue, wherein the command queue and the completion queue are accessed by the multi-host device.

34. The blade computer system of claim 28, wherein the first and second host blades each comprise a plurality of command registers configured to interface with the multi-host device.

* * * * *